United States Patent
Yonezawa

(10) Patent No.: US 9,494,773 B2
(45) Date of Patent: *Nov. 15, 2016

(54) IMAGE PICKUP LENS

(71) Applicant: KANTATSU CO., LTD., Yaita-shi, Tochigi (JP)

(72) Inventor: Tomohiro Yonezawa, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,321

(22) Filed: Sep. 10, 2014

(65) Prior Publication Data

US 2014/0376110 A1    Dec. 25, 2014

Related U.S. Application Data

(63) Continuation of application No. 13/927,370, filed on Jun. 26, 2013.

(30) Foreign Application Priority Data

Jun. 29, 2012 (JP) .................................. 2012-147403

(51) Int. Cl.
  *G02B 13/18*   (2006.01)
  *G02B 13/00*   (2006.01)

(52) U.S. Cl.
  CPC ........... *G02B 13/18* (2013.01); *G02B 13/0045* (2013.01)

(58) Field of Classification Search
  CPC .... G02B 13/0045; G02B 13/18; G02B 9/10; G02B 9/60
  See application file for complete search history.

(56) References Cited

U.S. PATENT DOCUMENTS

| 8,179,615 B1 | 5/2012 | Tang et al. |
| 8,456,758 B1 | 6/2013 | Huang et al. |

(Continued)

FOREIGN PATENT DOCUMENTS

| CN | 102466854 B | 8/2014 |
| JP | 2007-264180 A | 10/2007 |

(Continued)

OTHER PUBLICATIONS

Office Action dated Apr. 9, 2015, issued in co-pending U.S. Appl. No. 13/927,370 (22 pages).

(Continued)

*Primary Examiner* — Thomas K Pham
*Assistant Examiner* — Cara Rakowski
(74) *Attorney, Agent, or Firm* — Oliff PLC

(57) ABSTRACT

An image pickup lens includes an aperture stop, a first lens with positive refractive power having a convex object-side surface, a second meniscus lens having a concave image-side surface, a third meniscus lens having a convex image-side surface, a fourth meniscus lens having a concave object-side surface near an optical axis, and a fifth meniscus lens having a concave image-side surface near the optical axis, wherein the image-side surface of the fourth lens has an aspherical shape in which a positive refractive power weakens toward the periphery, and wherein the following conditional expressions (1) and (7) are satisfied:

$$0.55 < f1/f < 1.0 \quad (1)$$

$$-1.6 < f2/f < -0.7 \quad (7)$$

where f represents a focal length of an overall image pickup lens, f1 represents a first lens focal length, and f2 represents a second lens focal length.

11 Claims, 12 Drawing Sheets

(56) References Cited

U.S. PATENT DOCUMENTS

| | | | |
|---|---|---|---|
| 2010/0254029 A1* | 10/2010 | Shinohara | 359/764 |
| 2011/0273611 A1* | 11/2011 | Matsusaka et al. | 348/345 |
| 2011/0310287 A1* | 12/2011 | Ohtsu | 348/340 |
| 2012/0087020 A1 | 4/2012 | Tang et al. | |
| 2012/0194920 A1* | 8/2012 | Huang | G02B 13/18 359/714 |
| 2013/0003195 A1 | 1/2013 | Kubota et al. | |
| 2013/0021678 A1 | 1/2013 | Tsai et al. | |
| 2013/0088788 A1 | 4/2013 | You | |
| 2013/0170048 A1 | 7/2013 | Lai | |
| 2013/0329307 A1* | 12/2013 | Jung | G02B 13/0045 359/714 |

FOREIGN PATENT DOCUMENTS

| | | |
|---|---|---|
| JP | 2007-298572 A | 11/2007 |
| JP | 2011-085733 A | 4/2011 |
| JP | 2013-054099 A | 3/2013 |
| JP | 2013-257527 A | 12/2013 |
| WO | 2013/099255 A1 | 7/2013 |

OTHER PUBLICATIONS

Office Action dated Jan. 6, 2016, issued in co-pending U.S. Appl. No. 13/927,370 (15 pages).

Feb. 2, 2016 Office Action issued in Japanese Application No. 2012-147403.

* cited by examiner

IMAGE PICKUP LENS

CROSS REFERENCE TO RELATED APPLICATION

This application is a continuation of U.S. application Ser. No. 13/927,370, filed on Jun. 26, 2013, the contents of which are incorporated herein by reference.

The present application is based on and claims priority of Japanese patent application No. 2012-147403 filed on Jun. 29, 2012, the entire contents of which are hereby incorporated by reference.

BACKGROUND OF THE INVENTION

1. Field of the Invention

The present invention relates to an image pickup lens to be mounted on imaging devices adopting relatively small and thin solid-state imaging elements such as CCD sensors or C-MOS sensors mounted on portable terminals such as cellular phones and smartphones or PDAs (Personal Digital Assistants).

2. Description of the Related Art

Recently, most portable terminals such as cellular phones and smartphones, PDAs and other devices are readily equipped with a camera function. With the aim to enhance the portability and usability of these devices, further downsizing and thinning of the devices have been considered, and at the same time, the improvement of the camera function corresponding to increased number of pixels has also been considered. In response to this trend, further downsizing and increase in the number of pixels are realized in imaging elements adopted in the imaging devices mounted to such devices. Furthermore, the image pickup lenses disposed in these imaging devices are required to not only have high resolving power to correspond to the increased number of pixels but also realize downsizing and thinning. Moreover, there are strong demands for an image pickup lens having a bright lens system and a wide angle of field capable of taking an image of an object from a wide area, and corresponding to the highly dense imaging elements.

In the prior art, a large number of image pickup lenses having a three-lens configuration capable of correcting aberrations to a certain level and preferable from viewpoints of size and costs had been adopted as image pickup lenses mounted on the above-listed devices, but along with the increase in the number of pixels of the imaging elements, image pickup lenses adopting a four-lens configuration realizing a higher performance than the three-lens configuration are becoming popular. Recently, however, along with the further increase in the number of pixels of imaging devices, devices having a camera function with pixels exceeding far beyond 5 megapixels are provided. In response to such trend of increase in the number of pixels, image pickup lenses having a five-lens configuration capable of realizing even higher resolution and higher performance than the four-lens configuration have been proposed.

For example, Japanese Patent Laid-Open No. 2007-264180 (Patent Document 1) discloses an image pickup lens having, in order from an object side, a positive first lens having a convex object-side surface, a negative second lens having a meniscus shape with a concave surface facing an image side, a positive third lens having a meniscus shape with a convex surface facing the image side, a negative fourth lens having both surfaces formed as aspherical surfaces and having the image-side surface concaved near an optical axis, and a positive or a negative fifth lens having both surfaces formed as aspherical surfaces.

Further, Japanese Patent Laid-Open No. 2011-085733 (Patent Document 2) discloses an image pickup lens system having, in order from an object side, a first lens group including a first lens having a convex shape on the object side, a second lens group including a second lens having a concave shape on an imaging side, a third lens group including a third lens having a meniscus shape and a concave surface arranged on the object side, a fourth lens group including a fourth lens having a meniscus shape and a concave surface arranged on the object side, and a fifth lens group including a fifth lens having a meniscus shape that has an aspherical surface with an inflection point arranged on the object side.

According to the image pickup lens disclosed in Patent Document 1, a high-performance image pickup lens system having a five-lens configuration capable of effectively correcting axial chromatic aberration and chromatic aberration of magnification and responding to the increase in the number of pixels is realized by optimizing the materials of the lenses and the surface shapes of the lenses. However, the total track length of the lens system is approximately 8 mm, which still leaves a problem in applying the lens to devices requiring further thinning. Further, since the F-value of the lens is approximately 2.8 and the angle of field is approximately 32°, it cannot be said that the disclosed lens provides a sufficiently bright lens system or a wide angle of field that is required in recent lens systems.

The image pickup lens disclosed in Patent Document 2 realizes a high resolving power and a total track length of approximately 6 mm, which realizes relative downsizing and thinning in a lens system. However, the F-value of the lens is approximately 2.8 and the angle of field is approximately 32°, which means that the image pickup lens described in Patent Document 2 cannot sufficiently satisfy the specifications (high resolution, downsizing, thinning, bright lens system, and wide angle of field) required in recent lens systems.

SUMMARY OF THE INVENTION

The present invention aims at solving the above-mentioned problems of the prior art, by providing an image pickup lens adopting a five-lens configuration capable of realizing downsizing and thinning, with high resolution, small F-value and wide angle of field.

The term downsizing and thinning mentioned above refers to the level of downsizing that satisfies TTL/(2 IH)<1.0, when a maximum image height of the image being formed via the image pickup lens is denoted as IH, and a distance on an optical axis from the surface of the image pickup lens arranged closest to the object side to the image pickup plane is denoted as total track length TTL. For example, the level of downsizing refers to a level where the total track length of the image pickup lens is shorter than a diagonal length of an effective image pickup plane of the imaging element.

As for the F-value, the number should be as bright as approximately F2.6 or smaller, and the angle of field should be as wide as 70° or greater in total angle of field.

According to one aspect of the present invention, an image pickup lens is composed of five lenses for a solid-state imaging element, and having, in order from an object side to an image side, an aperture stop, a first lens having a positive refractive power with a convex surface facing the object side, a second lens as a meniscus lens with a concave surface facing the image side, a third lens as a meniscus lens with a convex surface facing the image side, a fourth lens as a meniscus lens with a concave surface facing the object side near an optical axis, and a fifth lens as a meniscus lens with a concave surface facing the image side near the optical axis, wherein the image-side surface of the fourth lens has an aspherical shape in which a positive refractive power weakens toward the periphery. In addition to the above configuration, the following conditional expressions (1) and (7) are satisfied:

$$0.55 < f1/f < 1.0 \tag{1}$$

$$-1.6 < f2/f < -0.7 \tag{7}$$

where f represents a focal length of an overall optical system of the image pickup lens, f1 represents a focal length of the first lens, and f2 represents a focal length of the second lens.

According to the image pickup lens mentioned above having a five-lens configuration, when the first lens, the second lens and the third lens are considered as a front group, and the fourth lens and the fifth lens are considered as a rear group, the configuration is similar to a so-called telephoto lens type where the front group has a positive refractive power as a whole and the rear group has a negative refractive power as a whole. By adopting such configuration and having the image-side surface of the fifth lens formed as concave surface, it becomes possible to shorten the total track length easily. Moreover, by having both surfaces of the fourth and fifth lenses formed as appropriate aspherical shapes, it becomes possible to realize the effects of correcting various aberrations and suppressing the angle of rays incident on the imaging elements.

Conditional expression (1) defines the ratio of the focal length of the first lens to the focal length of the overall image pickup lens system within an appropriate range, which is a condition for shortening the total track length, suppressing the occurrence of various off-axis aberrations, and enabling satisfactory correction of aberration. If the value exceeds the upper limit of conditional expression (1), the positive power of the first lens with respect to the power of the overall image pickup lens system becomes too weak, so that it is advantageous in reducing the fabrication error sensitivity of the lens, but disadvantageous in shortening the total track length, and therefore, downsizing and thinning become difficult to achieve. On the other hand, if the value is below the lower limit of conditional expression (1), the positive power of the first lens with respect to the power of the overall image pickup lens system becomes too strong, so that the correction of astigmatism and field curvature becomes especially difficult. Further, it is not preferable since the fabrication error sensitivity of the lens becomes high, and the accuracy of assembly is deteriorated.

Conditional expression (7) defines a ratio of the focal length of the second lens with respect to the focal length of the overall image pickup lens system within an appropriate range, which is a condition for shortening the total track length while suppressing the occurrence of various axial and off-axis aberrations. When the value exceeds the upper limit of conditional expression (7), the negative power of the second lens with respect to the power of the overall image pickup lens system becomes too strong, and the correction of axial and off-axis chromatic aberration becomes excessive (where the chromatic aberration of short wavelengths increases in the positive direction with respect to the chromatic aberration of reference wavelength). Further, since the image-formation surface is curved toward the image side, it becomes difficult to achieve a good image formation performance. Even further, since the curvature radius of the image-side surface of the second lens becomes too small, total reflection of off-axis rays may cause stray light, which may lead to the occurrence of ghosts or flares. On the other hand, if the value is below the lower limit of conditional expression (7), the negative power of the second lens with respect to the power of the overall image pickup lens system becomes too weak, which may be advantageous in shortening the total track length, but the correction of axial and off-axis chromatic aberration becomes insufficient (where the chromatic aberration of short wavelengths increases in the negative direction with respect to the chromatic aberration of reference wavelength). Further, since the image-formation surface is curved toward the object side, it also becomes difficult to achieve a good image formation performance.

Further, the image pickup lens according to the present invention preferably satisfies the following conditional expressions (2) through (6):

$$50 < v1 < 70 \tag{2}$$

$$v2 < 35 \tag{3}$$

$$50 < v3 < 70 \tag{4}$$

$$50 < v4 < 70 \tag{5}$$

$$50 < v5 < 70 \tag{6}$$

where v1 represents an Abbe number of the first lens, v2 represents an Abbe number of the second lens, v3 represents an Abbe number of the third lens, v4 represents an Abbe number of the fourth lens, and v5 represents an Abbe number of the fifth lens.

Conditional expressions (2) through (6) define the range of the Abbe number of the respective lens materials, which are conditions for preferably correcting the axial chromatic aberration and chromatic aberration of magnification. According to conditional expressions (2) through (6), the second lens is formed of a high-dispersion material, and the first, third, fourth and fifth lenses are formed of a low-dispersion material. Since the Abbe numbers of four out of five lenses are set to a value greater than 50, it becomes possible to more preferably correct axial chromatic aberration and chromatic aberration of magnification. Further, it is not preferable to use a material having an Abbe number that exceeds 70, since the lens material becomes too expensive and reduction of cost becomes difficult.

A generally-known method for correcting chromatic aberration is to combine a high-dispersion material with a low-dispersion material. In the case of an image pickup lens having a five-lens configuration, chromatic aberration can be corrected by alternately arranging a lens having a positive power formed of a low-dispersion material and a lens having a negative power formed of a high-dispersion material. However, when such method of correction is adopted, there is a restriction in the correction of chromatic aberration when further thinning is made. That is, according to a lens configuration where chromatic aberration is corrected by alternately arranging a high-dispersion material and a low-dispersion material, when the total track length is gradually shortened, the chromatic aberration of magnification changes from a correction insufficient state (where shorter wavelengths increase in the negative direction with respect to the reference wavelength) to a correction excessive state (where shorter wavelengths increase in the positive direction with respect to the reference wavelength) mainly in the off-axis rays from the low image-height area toward the high image-height area, and it becomes difficult to correct chromatic aberration of magnification satisfactorily throughout the overall image pickup plane. According to the present invention satisfying conditional expressions (2) to (6), the image pickup lens can realize both thinning and satisfactory correction of chromatic aberration of magnification, while overcoming the problems of insufficient correction and excessive correction of chromatic aberration of magnification.

The image pickup lens according to the present invention preferably satisfies the following conditional expression (8):

$$1.05 < f12/f < 1.60 \tag{8}$$

where f12 represents a composite focal length of the first and second lenses.

Conditional expression (8) defines the ratio of the composite focal length of the first and second lenses to the focal length of the overall image pickup lens system within an appropriate range, which is a condition for ensuring back focus and enabling a preferable correction of aberration while shortening the total track length and widening the angle of field. If the value exceeds the upper limit of conditional expression (8), the positive composite power of the first and second lenses with respect to the power of the overall image pickup lens system becomes too weak, so that the focal length becomes long, and it becomes difficult to achieve the shortening of the total track length and widening of the angle of field. On the other hand, if the value is below the lower limit of conditional expression (8), the positive composite power of the first and second lenses with respect to the power of the overall image pickup lens system becomes too strong, so that the focal length becomes short, which is advantageous in realizing a wide angle of field, but is difficult to ensure back focus. If the negative power of the fourth and fifth lenses is increased to ensure back focus, astigmatism mainly occurs off-axis, so that it becomes difficult to achieve satisfactory image formation performance. Further, if the curvature radius of the lens is reduced in order to achieve a large power, the fabrication error sensitivity becomes unfavorably high. The problems described above can be overcome by defining the positive composite power of the first and second lenses to the range defined in conditional expression (8).

Further, according to the image pickup lens of the present invention, it is preferable that the object-side surface of the fourth lens has an aspherical shape in which a negative power weakens toward the periphery, and the image-side surface thereof has an aspherical shape in which a positive power weakens toward the periphery. By adopting such aspherical shape in the fourth lens which is arranged distant from the aperture stop, the optical length of the rays passing through the fourth lens can be controlled. As a result, various aberrations of the respective image heights, mainly the astigmatism, can be corrected satisfactorily.

Further, the image pickup lens according to the present invention preferably satisfies the following conditional expression (9):

$$1.7 < v1/v2 < 2.7 \tag{9}$$

where v1 represents an Abbe number of the first lens, and v2 represents an Abbe number of the second lens.

Conditional expression (9) defines a condition for further suppressing the chromatic aberration of magnification and the axial chromatic aberration.

Further, the image pickup lens according to the present invention preferably satisfies the following conditional expression (10):

$$-0.80 < f1/f2 < -0.45 \tag{10}$$

where f1 represents a focal length of the first lens, and f2 represents a focal length of the second lens.

Conditional expression (10) defines the ratio of the focal length of the first lens to the focal length of the second lens within an appropriate range, which is a condition for controlling chromatic aberration, spherical aberration and coma aberration within a preferable range while realizing downsizing and widening of angle of field of the image pickup lens. If the value exceeds the upper limit of conditional expression (10), the negative power of the second lens with respect to the positive power of the first lens becomes relatively weak, so that it is advantageous in downsizing the image pickup lens, but the correction of axial chromatic aberration and off-axis chromatic aberration of magnification becomes insufficient (where the shorter wavelengths increase in the negative direction with respect to the reference wavelength), and it also becomes difficult to achieve a satisfactory image formation performance. On the other hand, if the value is below the lower limit of conditional expression (10), the negative power of the second lens with respect to the positive power of the first lens becomes relatively strong, so that the correction of off-axis chromatic aberration of magnification becomes excessive (where the shorter wavelengths increase in the positive direction with respect to the reference wavelength). Further, coma aberration increases with respect to the off-axis beam. Therefore, it becomes difficult to achieve a satisfactory image formation performance. When these aberrations are corrected by the lenses arranged subsequent to the second lens, the total track length is elongated and downsizing becomes difficult to achieve.

According to another aspect of the present invention, the image pickup lens is composed of five lenses for a solid-state imaging element, and having, in order from an object side to an image side, an aperture stop, a front group with a positive refractive power, and a rear group with a negative refractive power; the front group including: a first lens having a positive refractive power, a second lens as a meniscus lens having a negative refractive power with a concave surface facing the image side near the optical axis, and a third lens as a meniscus lens having a positive refractive power with a convex surface facing the image side near the optical axis; the rear group including: a fourth lens having both surfaces formed as aspherical surfaces with a convex surface facing the image side near the optical axis, and fifth lens as a meniscus lens having both surfaces formed as aspherical surfaces with a concave surface facing the image side near the optical axis; wherein the image-side surface of the fourth lens has an aspherical shape in which a positive refractive power weakens toward the periphery. In addition to the above configuration, the following conditional expressions (7) and (8) are satisfied:

$$-1.6 < f2/f < -0.7 \tag{7}$$

$$1.05 < f12/f < 1.60 \tag{8}$$

where f represents a focal length of an overall optical system of the image pickup lens, f2 represents a focal length of the second lens, and f12 represents a composite focal length of the first and second lenses.

DETAILED DESCRIPTION OF THE PREFERRED EMBODIMENTS

Now, preferred embodiments of the present invention will be described in detail with reference to the drawings.

FIGS. 1, 3, 5, 7, 9 and 11, respectively, are general configuration diagrams of the image pickup lenses according to Embodiments 1 through 6 of the present embodiment. The basic lens configuration is the same in all embodiments, so that an explanation is given on the image pickup lens configuration of the present embodiment with reference to the general configuration diagram of Embodiment 1.

Figure 1:
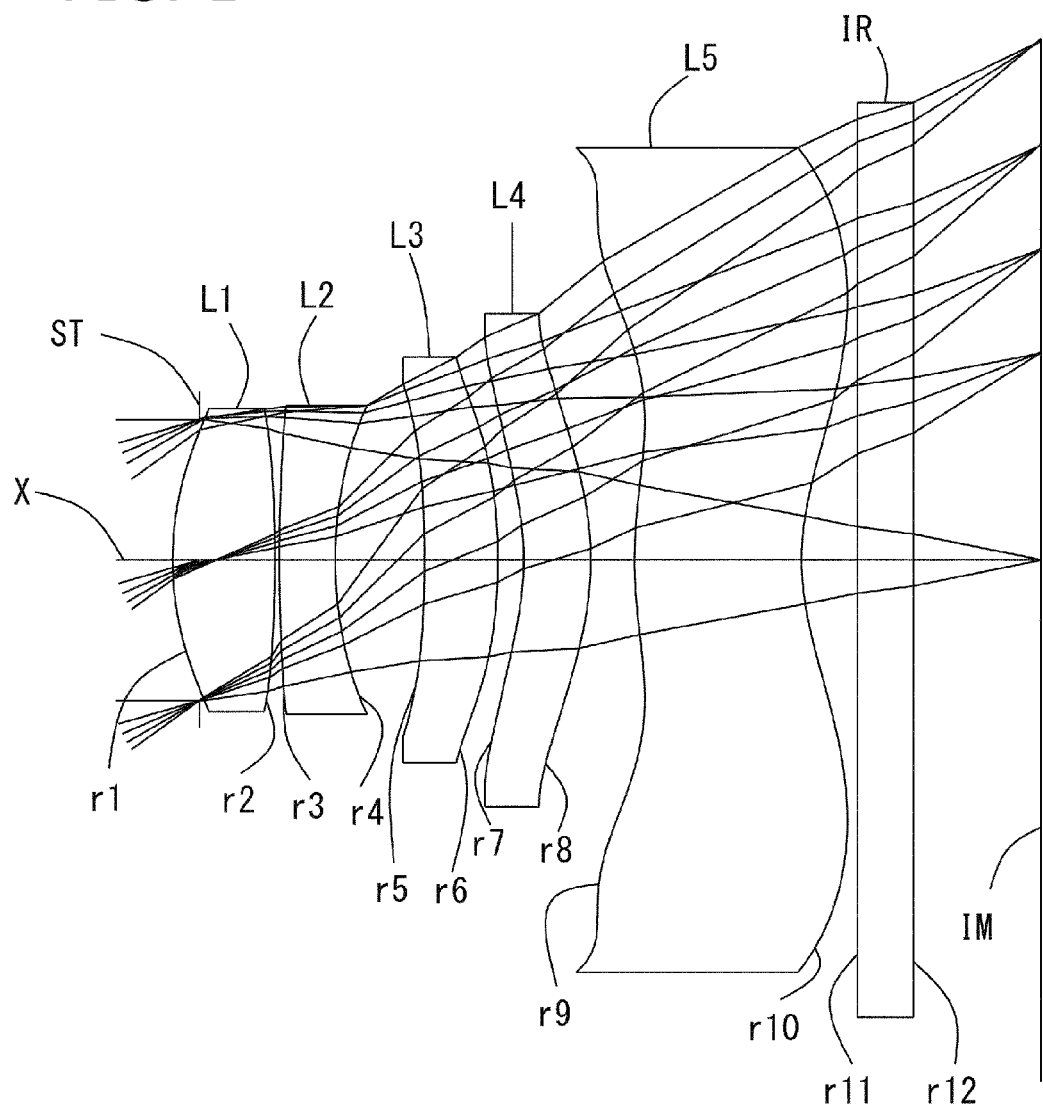
FIG. 1 is a view showing a general configuration of an image pickup lens according to Embodiment 1.

As shown in FIG. 1, an image pickup lens of the present embodiment is composed of, in order from an object side to an image side, a first lens L1 having a positive refractive power, a second lens L2 having a negative refractive power, a third lens L3 having a positive refractive power, a fourth lens L4 having a negative refractive power, and a fifth lens L5 having a negative refractive power. An aperture stop ST is arranged on the object side of the first lens L1. A filter IR is arranged between the fifth lens L5 and an image plane IM. The filter IR can be omitted. The value having the filter removed from the lens configuration is adopted when computing the total track length of the image pickup lens.

In the image pickup lens having the above-mentioned five-lens configuration, the first lens L1 is a biconvex lens with both an object-side surface r1 and an image-side surface r2 being a convex surface, the second lens L2 is a meniscus lens with an object-side surface r3 being a convex surface and an image-side surface r4 being a concave surface, the third lens L3 is a meniscus lens with an object-side surface r5 being a concave surface and an image-side surface r6 being a convex surface, the fourth lens L4 is a meniscus lens with an object-side surface r7 being a concave surface and an image-side surface r8 being a convex surface near an optical axis X, and the fifth lens L5 is a meniscus lens with an object-side surface r9 being a convex surface and an image-side surface r10 being a concave surface near the optical axis X.

The object-side surface r3 of the second lens L2 is a lens surface having a weak refractive power with respect to the focal length of the second lens L2, and the curvature radius thereof is relatively large. The shape of the object-side surface r3 of the second lens L2 is not restricted to a convex surface, and can be a concave surface. The second lens L2 according to Embodiment 3 of the present embodiment shows an example of a biconcave lens where the object-side surface r3 and the image-side surface r4 of the second lens L2 are both concave surfaces.

The above-described configuration is similar to a so-called telephoto type lens, when the first lens L1, the second lens L2 and the third lens L3 out of the five lenses L1 through L5 are considered as a front group and the fourth lens L4 and the fifth lens L5 are considered as a rear group, wherein the front group has a positive refractive power as a whole and the rear group has a negative refractive power as a whole, and in addition to this power configuration, by having the image-side surface r10 of the fifth lens L5 formed as a concave surface, it becomes possible to shorten the total track length. Moreover, by having both surfaces of the fourth lens L4 and the fifth lens L5 formed as appropriate aspheric shapes, it becomes possible to achieve the effects of correcting various aberrations and restraining the angle of rays incident on the imaging elements.

Further, according further to the present embodiment, all the image pickup lenses are formed of plastic materials. In all the preferred embodiments, the first lens L1, the third lens L3, the fourth lens L4 and the fifth lens L5 are formed of olefinic plastic material, and the second lens L2 is formed of polycarbonate plastic material.

By using plastic material for all the lenses, it becomes possible to realize stable mass production and facilitate cost reduction. Further, since the first lens L1, the third lens L3, the fourth lens L4 and the fifth lens L5 are formed of the same material, they can be fabricated easily.

The image pickup lens according to the present invention satisfies the following conditional expressions.

$$0.55 < f1/f < 1.0 \tag{1}$$

$$50 < v1 < 70 \tag{2}$$

$$v2 < 35 \tag{3}$$

$$50 < v3 < 70 \tag{4}$$

$$50 < v4 < 70 \tag{5}$$

$$50 < v5 < 70 \tag{6}$$

$$-1.6 < f2/f < -0.7 \tag{7}$$

$$1.05 < f12/f < 1.60 \tag{8}$$

$$1.7 < v1/v2 < 2.7 \tag{9}$$

$$-0.80 < f1/f2 < -0.45 \tag{10}$$

where
f: focal length of the overall optical system of the image pickup lens
f1: focal length of the first lens
f2: focal length of the second lens
f12: composite focal length of the first and second lenses
v1: Abbe number of the first lens
v2: Abbe number of the second lens
v3: Abbe number of the third lens v4: Abbe number of the fourth lens
v5: Abbe number of the fifth lens In the present embodiment, all lens surfaces are formed as aspherical surfaces. The aspherical shape adopted in these lens surfaces is represented by the following expression, when an axis in the optical axis direction is denoted as Z, a height in a direction orthogonal to the optical axis is denoted as H, a conic constant is denoted as k, and aspherical coefficients are denoted as A4, A6, A8, A10, A12, A14 and A16.

$$Z = \frac{\frac{H^2}{R}}{1 + \sqrt{1 - (k-1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Expression 1

Next, preferred embodiments of the image pickup lens according to the present embodiment are shown. In each embodiment, f represents a focal length of the overall image pickup lens system, Fno represents an F-number, ω represents a half angle of field, and IH represents a maximum image height. Further, i represents a surface number counted from the object side, r represents a curvature radius, d represents a distance between lens surfaces on the optical axis (surface distance), Nd represents a refractive index with respect to a d-ray (reference wavelength), and νd represents an Abbe number with respect to the d-ray. Aspherical surfaces are shown with a sign * (asterisk) after the surface number i.

Embodiment 1

Basic lens data are shown in Table 1 below.

TABLE 1

Embodiment 1
Unit mm f = 3.810
Fno = 2.52
ω(°) = 35.78
IH = 2.791

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.145 | | |
| 2* | 1.654 | 0.549 | 1.5351 | 56.12 |
| 3* | −6.619 | 0.025 | | |
| 4* | 12.424 | 0.300 | 1.6355 | 23.91 |
| 5* | 2.211 | 0.474 | | |
| 6* | −10.440 | 0.416 | 1.5351 | 56.12 |
| 7* | −3.131 | 0.137 | | |
| 8* | −1.432 | 0.354 | 1.5351 | 56.12 |
| 9* | −1.588 | 0.237 | | |
| 10* | 2.324 | 0.897 | 1.5351 | 56.12 |
| 11* | 1.386 | 0.300 | | |
| 12 | Infinity | 0.3 | 1.5168 | 64.20 |
| 13 | Infinity | 0.680 | | |
| Image Plane | Infinity | | | |

Aspherical Surface Data

| | 2nd Surface | 3rd Surface | 4th Surface | 5th Surface | 6th Surface |
|---|---|---|---|---|---|
| k | −1.802E+00 | 1.351E+01 | 0.000E+00 | 1.732E+00 | 2.721E+00 |
| A4 | 2.749E−02 | 8.503E−02 | 3.580E−02 | −5.643E−02 | −1.233E−01 |
| A6 | 1.542E−02 | −2.531E−01 | −3.023E−02 | 2.019E−01 | −2.662E−02 |
| A8 | −4.323E−02 | 2.421E−01 | −1.422E−01 | −3.714E−01 | 1.753E−01 |
| A10 | −3.872E−02 | −1.266E−01 | 3.071E−01 | 3.347E−01 | −6.943E−02 |
| A12 | −8.698E−03 | 6.959E−03 | −1.103E−01 | −7.921E−02 | −3.900E−02 |
| A14 | 0.000E+00 | 0.000E+00 | 0.000E+00 | 0.000E+00 | −1.200E−04 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | −7.532E+00 | −7.834E+00 | 0.000E+00 | −2.882E+00 |
| A4 | −5.166E−02 | 9.012E−02 | −6.513E−02 | −2.554E−01 | −1.410E−01 |
| A6 | −5.871E−02 | −2.566E−02 | 1.526E−02 | 6.449E−02 | 6.493E−02 |
| A8 | 1.167E−01 | −7.473E−02 | −1.634E−01 | −4.635E−03 | −2.209E−02 |
| A10 | −3.459E−02 | 7.815E−02 | 8.855E−02 | 5.666E−05 | 4.791E−03 |
| A12 | −8.978E−05 | −2.090E−02 | −1.828E−02 | −5.779E−05 | −5.930E−04 |
| A14 | −1.079E−04 | 1.201E−07 | 5.355E−04 | −1.643E−08 | 3.281E−05 |
| A16 | 0.000E+00 | 0.000E+00 | 0.000E+00 | 0.000E+00 | −2.714E−07 |

The image pickup lens according to Embodiment 1 satisfies all conditional expressions (1) through (10), as shown in Table 7.

Figure 2:
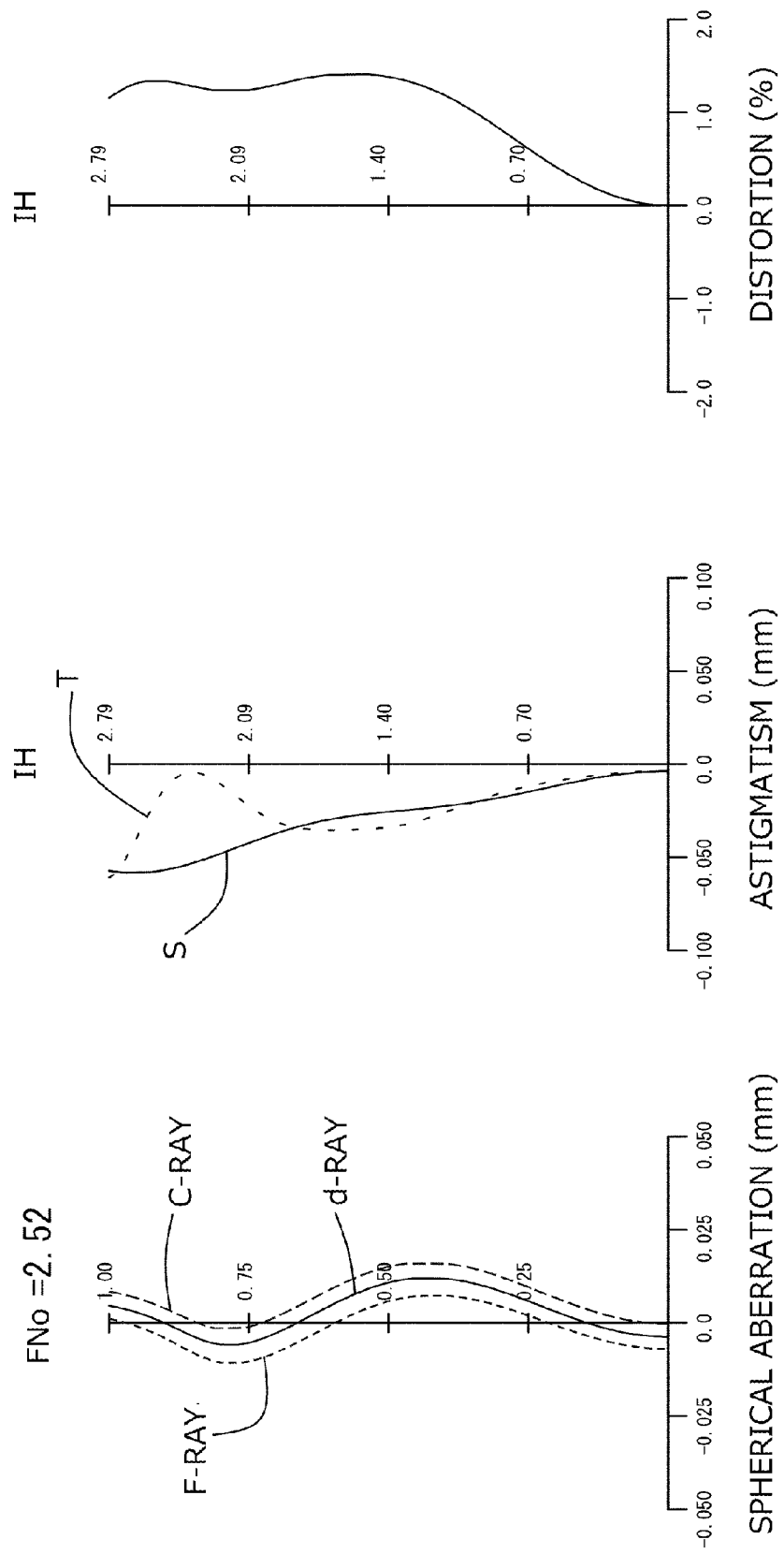
FIG. 2 is a view showing a spherical aberration, an astigmatism and a distortion of the image pickup lens according to Embodiment 1.
Figure 3:
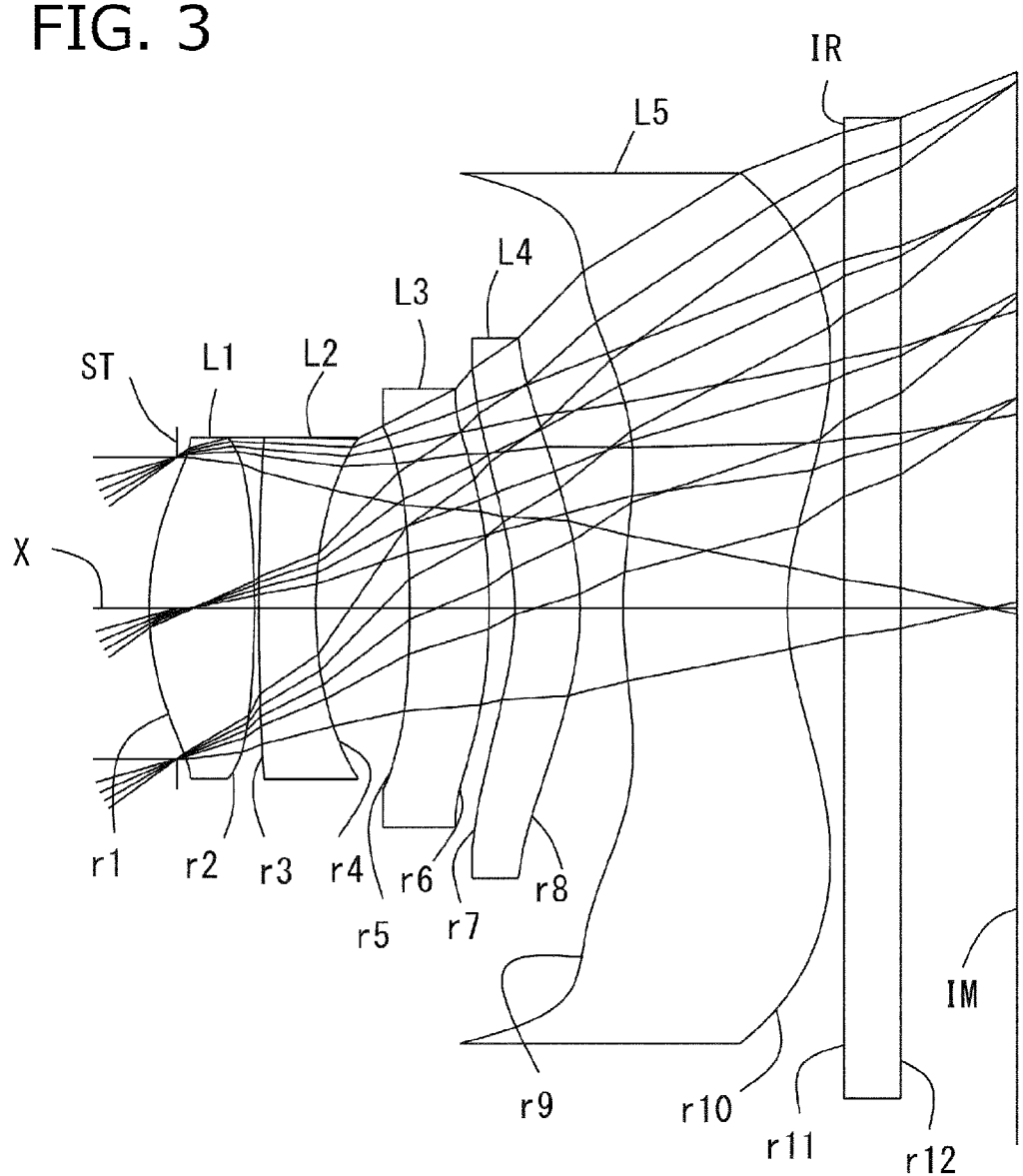
FIG. 3 is a view showing a general configuration of an image pickup lens according to Embodiment 2.

FIG. 2 shows a spherical aberration (mm), an astigmatism (mm), and a distortion (%) of the image pickup lens according to Embodiment 1. The spherical aberration diagram illustrates the amount of aberration with respect to the respective wavelengths of F-ray (486 nm), d-ray (588 nm) and C-ray (656 nm). Further, the astigmatism diagram illustrates the respective amounts of aberration on a sagittal image surface S and a tangential image surface T (the same applies to FIGS. 4, 6, 8, 10 and 12). As shown in FIG. 2, it can be seen that the respective aberrations are satisfactorily corrected.

Further, the total track length TTL is as short as 4.56 mm and the ratio thereof to the maximum image height IH (TTL/2 IH) is 0.82, so that downsizing is realized even in a five-lens configuration. Moreover, the F-value is as bright as 2.52, and the half angle of field is approximately 35.8°, so that a relatively wide angle of field is realized.

Embodiment 2

Basic lens data are shown in Table 2 below.

TABLE 2

| Embodiment 2 Unit mm |
|---|

| $f = 3.805$ |
| $Fno = 2.38$ |
| $\omega(°) = 35.98$ |
| $IH = 2.791$ |

| Surface Data | | | | |
|---|---|---|---|---|
| Surface No. i | Curvature Radius r | Surface Distance d | Refractive Index Nd | Abbe Number vd |
| (Object Surface) | Infinity | Infinity | | |
| 1 (Stop) | Infinity | −0.145 | | |
| 2* | 1.558 | 0.556 | 1.5346 | 56.16 |
| 3* | −5.369 | 0.025 | | |
| 4* | 25.731 | 0.300 | 1.6142 | 25.58 |
| 5* | 2.176 | 0.497 | | |
| 6* | −9.466 | 0.421 | 1.5346 | 56.16 |
| 7* | −3.551 | 0.138 | | |
| 8* | −1.410 | 0.346 | 1.5346 | 56.16 |
| 9* | −1.562 | 0.227 | | |
| 10* | 2.353 | 0.870 | 1.5346 | 56.16 |
| 11* | 1.409 | 0.300 | | |
| 12 | Infinity | 0.300 | 1.5168 | 64.20 |
| 13 | Infinity | 0.617 | | |
| Image Plane | Infinity | | | |

| Aspherical Surface Data | | | | |
|---|---|---|---|---|
| | 2nd Surface | 3rd Surface | 4th Surface | 5th Surface | 6th Surface |
| k | −1.722E+00 | 1.350E+01 | 0.000E+00 | 1.798E+00 | 3.100E+01 |
| A4 | 2.965E−02 | 8.554E−02 | 3.886E−02 | −5.670E−02 | −1.286E−01 |
| A6 | 1.582E−02 | −2.568E−01 | −2.433E−02 | 2.089E−01 | −3.491E−02 |
| A8 | −5.394E−02 | 2.280E−01 | −1.416E−01 | −3.519E−01 | 1.679E−01 |
| A10 | −6.862E−02 | −1.582E−01 | 2.921E−01 | 3.496E−01 | −7.333E−02 |
| A12 | −2.789E−02 | −4.843E−02 | −1.547E−01 | −1.287E−01 | −3.876E−02 |
| A14 | 0.000E+00 | 0.000E+00 | 0.000E+00 | 0.000E+00 | 6.334E−03 |
| A16 | 0.000E+00 | 0.000E+00 | 0.000E+00 | 0.000E+00 | 0.000E+00 |
| | 7th Surface | 8th Surface | 9th Surface | 10th Surface | 11th Surface |
| k | 0.000E+00 | −7.470E+00 | −8.088E+00 | 0.000E+00 | −3.037E+00 |
| A4 | −4.742E−02 | 8.928E−02 | −6.639E−02 | −2.545E−01 | −1.433E−01 |
| A6 | −5.618E−02 | −2.505E−02 | 1.509E−01 | 6.471E−02 | 6.448E−02 |
| A8 | 1.171E−01 | −7.410E−02 | −1.640E−01 | −4.636E−03 | −2.213E−02 |
| A10 | −3.447E−02 | 7.819E−02 | 8.832E−02 | 4.273E−05 | 4.791E−03 |
| A12 | 4.966E−04 | −2.114E−02 | −1.837E−02 | −6.427E−05 | −5.928E−04 |
| A14 | 7.383E−04 | −2.128E−04 | 4.789E−04 | −2.449E−06 | 3.283E−05 |
| A16 | 0.000E+00 | 0.000E+00 | 0.000E+00 | 0.000E+00 | −2.766E−07 |

The image pickup lens according to Embodiment 2 satisfies all conditional expressions (1) through (10), as shown in Table 7.

Figure 4:
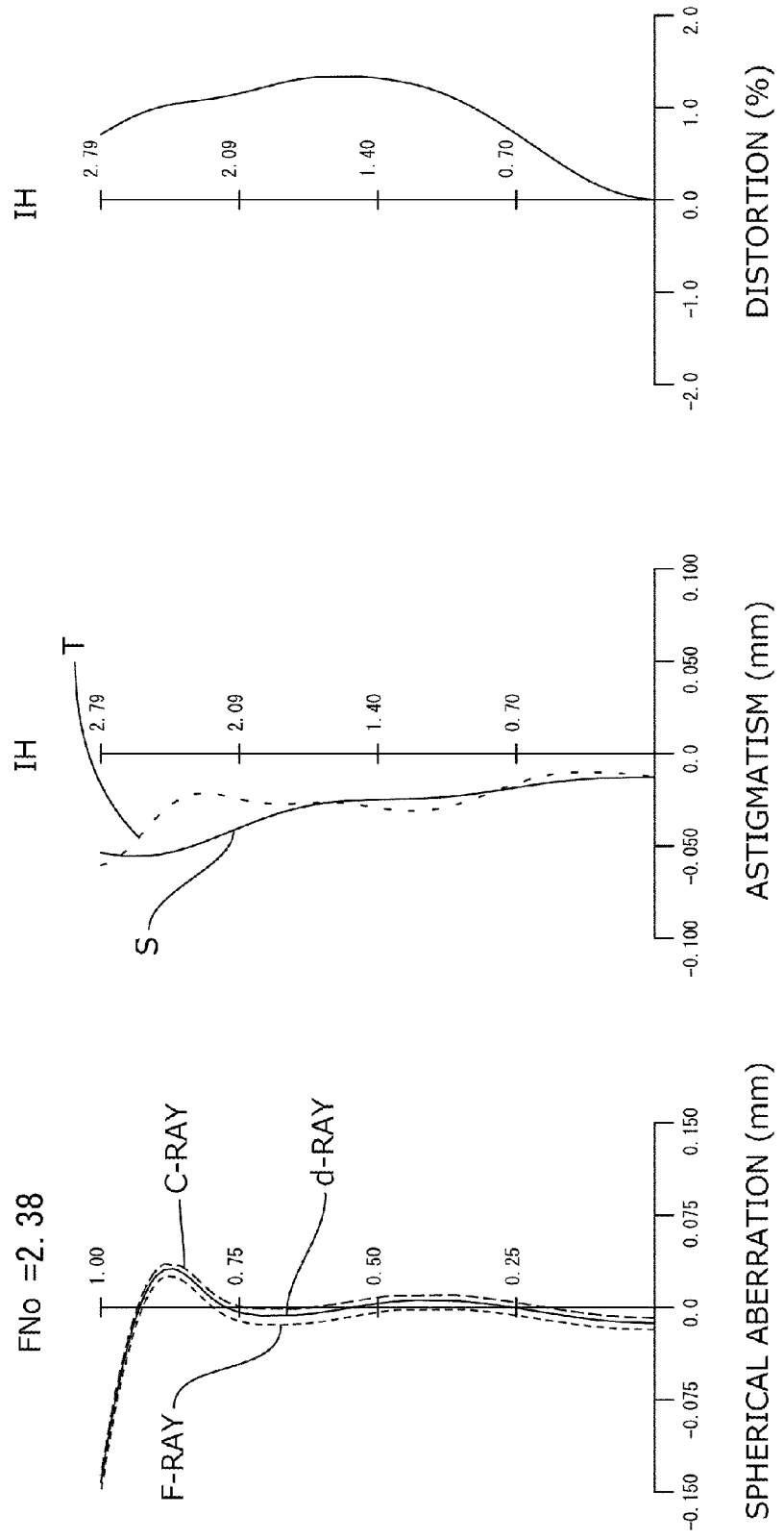
FIG. 4 is a view showing a spherical aberration, an astigmatism and a distortion of the image pickup lens according to Embodiment 2.
Figure 5:
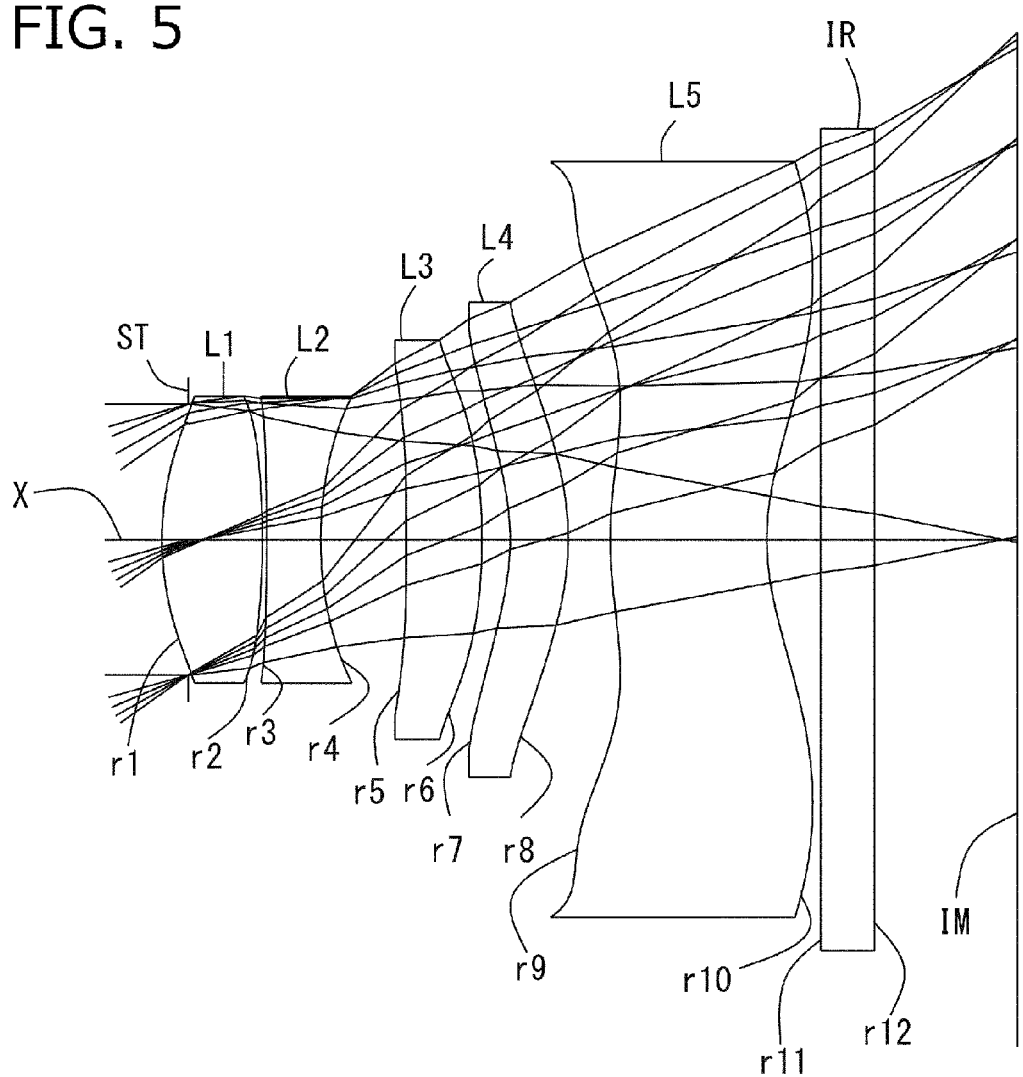
FIG. 5 is a view showing a general configuration of an image pickup lens according to Embodiment 3.

FIG. 4 shows a spherical aberration (mm), an astigmatism (mm), and a distortion (%) of the image pickup lens according to Embodiment 2. As shown in FIG. 4, it can be seen that the respective aberrations are satisfactorily corrected.

Further, the total track length TTL is as short as 4.48 mm and the ratio thereof to the maximum image height IH (TTL/2 IH) is 0.80, so that downsizing is realized even in a five-lens configuration. Moreover, the F-value is as bright as 2.38, and the half angle of field is approximately 36.0°, so that a relatively wide angle of field is achieved.

Embodiment 3

Basic lens data are shown in Table 3 below.

TABLE 3

Embodiment 3
Unit mm $f = 3.894$
$Fno = 2.58$
$\omega(°) = 35.30$
$IH = 2.791$

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.145 | | |
| 2* | 1.644 | 0.559 | 1.5441 | 55.98 |
| 3* | −4.408 | 0.025 | | |
| 4* | −12.995 | 0.300 | 1.5837 | 30.13 |
| 5* | 2.092 | 0.476 | | |
| 6* | −100.000 | 0.422 | 1.5441 | 55.98 |
| 7* | −3.312 | 0.157 | | |
| 8* | −1.383 | 0.324 | 1.5441 | 55.98 |
| 9* | −1.555 | 0.234 | | |
| 10* | 2.286 | 0.872 | 1.5441 | 55.98 |
| 11* | 1.405 | 0.300 | | |
| 12 | Infinity | 0.3 | 1.5168 | 64.20 |
| 13 | Infinity | 0.796 | | |
| Image Plane | Infinity | | | |

Aspherical Surface Data

| | 2nd Surface | 3rd Surface | 4th Surface | 5th Surface | 6th Surface |
|---|---|---|---|---|---|
| k | −1.829E+00 | 1.841E+01 | 0.000E+00 | 2.083E+00 | 0.000E+00 |
| A4 | 2.742E−02 | 9.983E−02 | 3.710E−02 | −5.179E−02 | −1.049E−01 |
| A6 | 1.508E−02 | −2.726E−01 | −2.474E−02 | 2.326E−01 | −2.892E−02 |
| A8 | −6.244E−02 | 2.116E−01 | −1.994E−01 | −3.869E−01 | 1.664E−01 |
| A10 | −7.095E−02 | −1.273E−01 | 1.627E−01 | 2.928E−01 | −7.478E−02 |
| A12 | −3.371E−02 | −8.438E−02 | −2.463E−02 | −1.143E−01 | −3.460E−02 |
| A14 | 0.000E+00 | 0.000E+00 | 0.000E+00 | 0.000E+00 | 1.437E−02 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | −6.274E+00 | −7.114E+00 | 0.000E+00 | −2.675E+00 |
| A4 | −5.744E−02 | 8.790E−02 | −6.626E−02 | −2.589E−01 | −1.454E−01 |
| A6 | −6.743E−02 | −2.471E−02 | 1.513E−01 | 6.441E−02 | 6.661E−02 |
| A8 | 1.115E−01 | −7.413E−02 | −1.642E−01 | −4.409E−03 | −2.207E−02 |
| A10 | −3.441E−02 | 7.843E−02 | 8.818E−02 | 1.314E−04 | 4.771E−03 |
| A12 | 1.717E−03 | −2.070E−02 | −1.837E−02 | −5.543E−05 | −5.951E−04 |
| A14 | 1.073E−03 | 1.684E−04 | 5.565E−04 | −1.046E−05 | 3.303E−05 |
| A16 | 0.000E+00 | 0.000E+00 | 0.000E+00 | 0.000E+00 | −1.381E−07 |

The image pickup lens according to Embodiment 3 satisfies all conditional expressions (1) through (10), as shown in Table 7.

Figure 6:
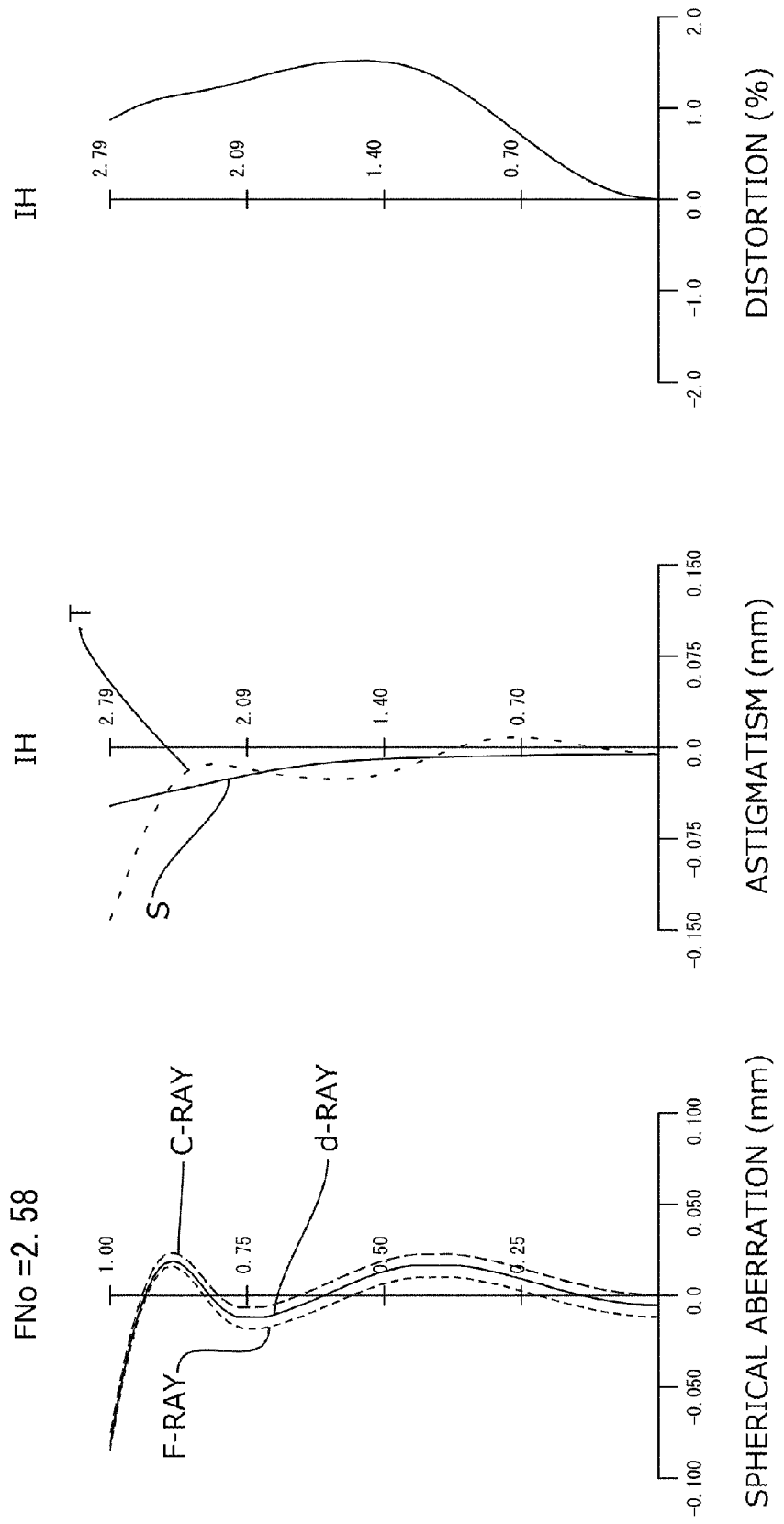
FIG. 6 is a view showing a spherical aberration, an astigmatism and a distortion of the image pickup lens according to Embodiment 3.
Figure 7:
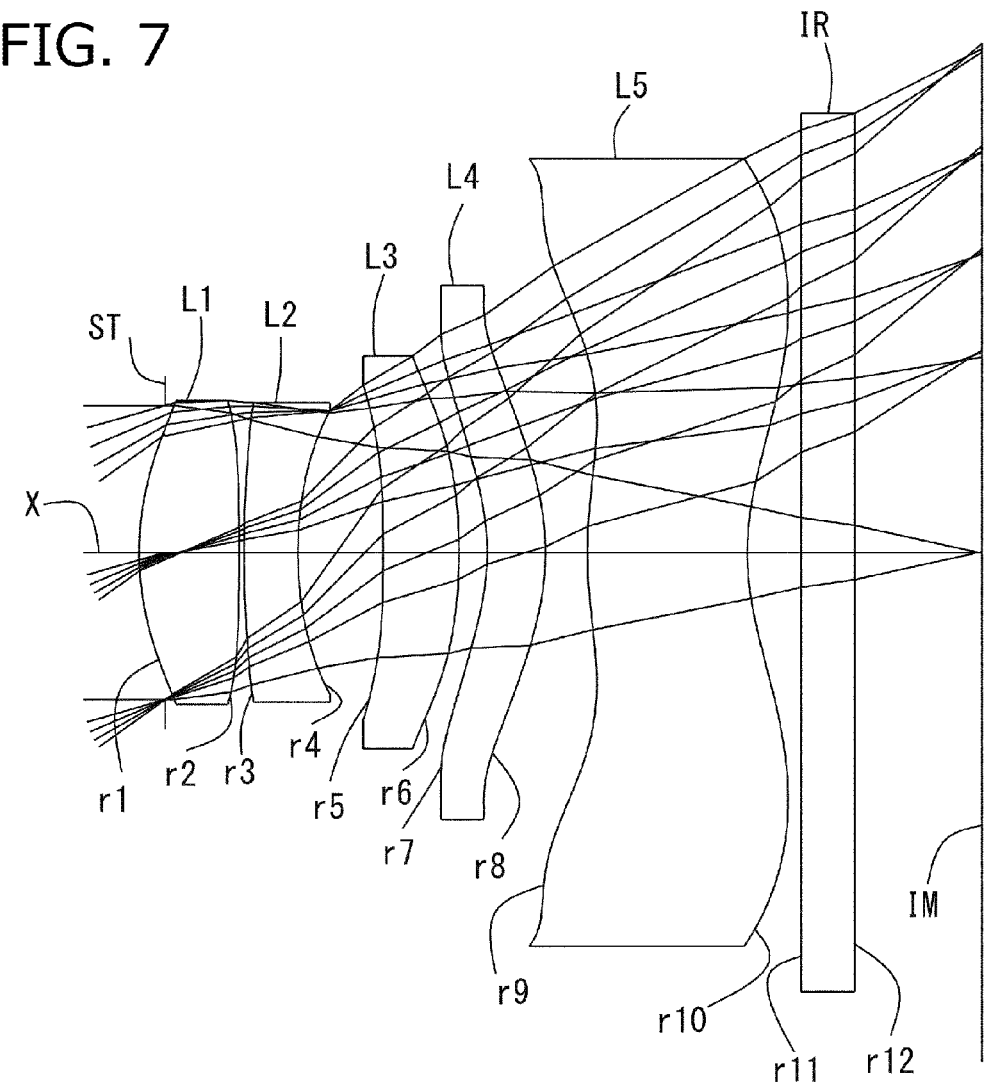
FIG. 7 is a view showing a general configuration of an image pickup lens according to Embodiment 4.

FIG. 6 shows a spherical aberration (mm), an astigmatism (mm), and a distortion (%) of the image pickup lens according to Embodiment 3. As shown in FIG. 6, it can be seen that the respective aberrations are satisfactorily corrected.

Further, the total track length TTL is as short as 4.65 mm and the ratio thereof to the maximum image height IH (TTL/2 IH) is 0.83, so that downsizing is realized even in a five-lens configuration. Moreover, the F-value is as bright as 2.58, and the half angle of field is approximately 35.3°, so that a relatively wide angle of field is achieved.

Embodiment 4

Basic lens data are shown in Table 4 below.

TABLE 4

| Embodiment 4 Unit mm |
| --- |

| f = 3.830 |
| --- |
| Fno = 2.34 |
| ω(°) = 35.58 |
| IH = 2.791 |

| Surface Data | | | | |
| --- | --- | --- | --- | --- |
| Surface No. i | Curvature Radius r | Surface Distance d | Refractive Index Nd | Abbe Number vd |
| (Object Surface) | Infinity | Infinity | | |
| 1 (Stop) | Infinity | −0.145 | | |
| 2* | 1.643 | 0.559 | 1.5441 | 55.98 |
| 3* | −10.528 | 0.025 | | |
| 4* | 6.987 | 0.300 | 1.6355 | 23.91 |
| 5* | 2.022 | 0.476 | | |
| 6* | −9.746 | 0.422 | 1.5441 | 55.98 |
| 7* | −2.990 | 0.157 | | |
| 8* | −1.273 | 0.324 | 1.5441 | 55.98 |
| 9* | −1.434 | 0.234 | | |
| 10* | 2.417 | 0.890 | 1.5441 | 55.98 |
| 11* | 1.493 | 0.300 | | |
| 12 | Infinity | 0.3 | 1.5168 | 64.20 |
| 13 | Infinity | 0.708 | | |
| Image Plane | Infinity | | | |

| Aspherical Surface Data | | | | |
| --- | --- | --- | --- | --- |
| | 2nd Surface | 3rd Surface | 4th Surface | 5th Surface | 6th Surface |
| k | −1.761E+00 | 9.900E+01 | 0.000E+00 | 2.006E+00 | −8.958E+00 |
| A4 | 2.686E−02 | 6.502E−02 | 3.011E−02 | −4.847E−02 | −1.317E−01 |
| A6 | 2.299E−02 | −2.721E−01 | −4.555E−02 | 2.204E−01 | −2.418E−02 |
| A8 | −7.311E−02 | 2.035E−01 | −1.602E−01 | −4.034E−01 | 1.716E−01 |
| A10 | −8.653E−02 | −1.121E−01 | 2.693E−01 | 3.051E−01 | −8.039E−02 |
| A12 | 7.550E−02 | 8.868E−02 | −1.523E−02 | −3.165E−02 | −4.690E−02 |
| A14 | 0.000E+00 | 0.000E+00 | 0.000E+00 | 0.000E+00 | 2.336E−02 |
| A16 | 0.000E+00 | 0.000E+00 | 0.000E+00 | 0.000E+00 | 0.000E+00 |
| | 7th Surface | 8th Surface | 9th Surface | 10th Surface | 11th Surface |
| k | 0.000E+00 | −5.397E+00 | −6.045E+00 | 0.000E+00 | −2.659E+00 |
| A4 | −6.512E−02 | 8.454E−02 | −7.363E−02 | −2.501E−01 | −1.452E−01 |
| A6 | −6.219E−02 | −2.477E−02 | 1.556E−01 | 6.296E−02 | 6.529E−02 |
| A8 | 1.107E−01 | −7.272E−02 | −1.627E−01 | −4.865E−03 | −2.205E−02 |
| A10 | −3.653E−02 | 7.916E−02 | 8.814E−02 | 8.702E−05 | 4.782E−03 |
| A12 | 1.414E−03 | −2.062E−02 | −1.840E−02 | −4.462E−05 | −5.934E−04 |
| A14 | 2.051E−03 | −2.242E−05 | 5.937E−04 | −2.153E−07 | 3.308E−05 |
| A16 | 0.000E+00 | 0.000E+00 | 0.000E+00 | 0.000E+00 | −2.681E−07 |

The image pickup lens according to Embodiment 4 satisfies all conditional expressions (1) through (10), as shown in Table 7.

Figure 8:
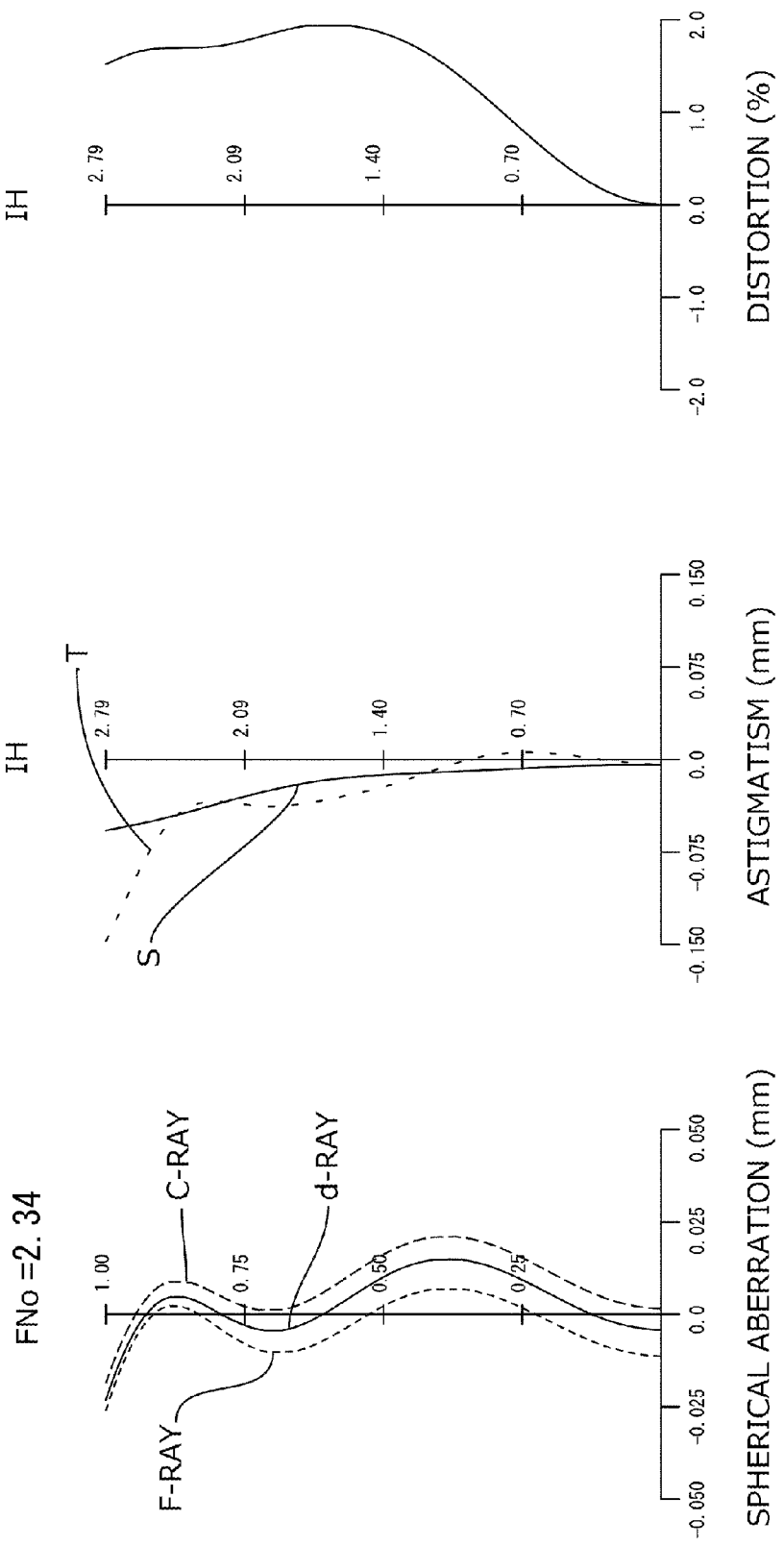
FIG. 8 is a view showing a spherical aberration, an astigmatism and a distortion of the image pickup lens according to Embodiment 4.
Figure 9:
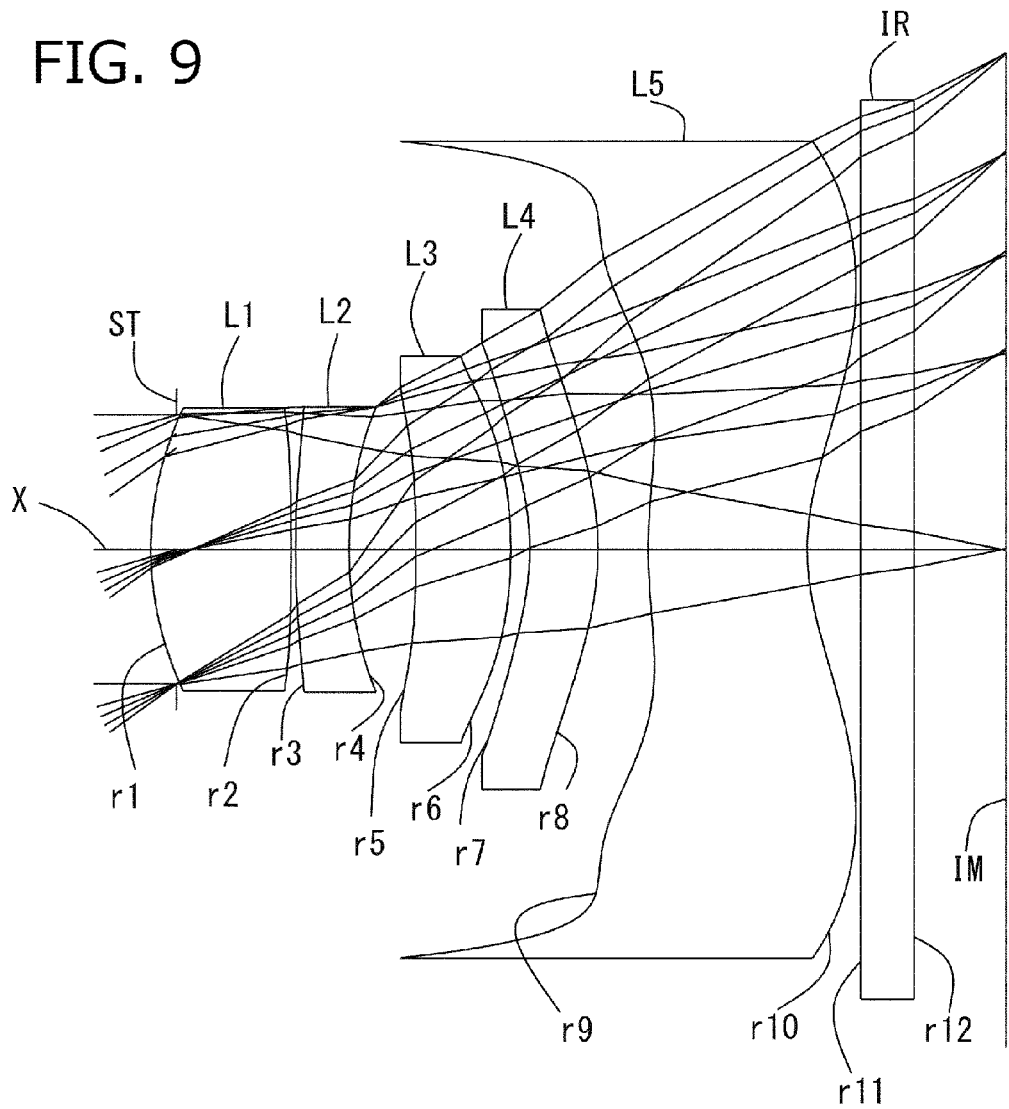
FIG. 9 is a view showing a general configuration of an image pickup lens according to Embodiment 5.

FIG. 8 shows a spherical aberration (mm), an astigmatism (mm), and a distortion (%) of the image pickup lens according to Embodiment 4. As shown in FIG. 8, it can be seen that the respective aberrations are satisfactorily corrected.

Further, the total track length TTL is as short as 4.59 mm and the ratio thereof to the maximum image height IH (TTL/2 IH) is 0.82, so that downsizing is realized even in a five-lens configuration. Moreover, the F-value is as bright as 2.34, and the half angle of field is approximately 35.6°, so that a relatively wide angle of field is achieved.

Embodiment 5

Basic lens data are shown in Table 5 below.

TABLE 5

Embodiment 5
Unit mm f = 3.809
Fno = 2.52
ω(°) = 35.83
IH = 2.791

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.145 | | |
| 2* | 1.760 | 0.788 | 1.5251 | 56.27 |
| 3* | −11.342 | 0.025 | | |
| 4* | 5.761 | 0.300 | 1.6319 | 23.42 |
| 5* | 2.232 | 0.374 | | |
| 6* | −10.505 | 0.533 | 1.5251 | 56.27 |
| 7* | −2.504 | 0.106 | | |
| 8* | −1.473 | 0.383 | 1.5251 | 56.27 |
| 9* | −1.664 | 0.282 | | |
| 10* | 2.861 | 0.892 | 1.5251 | 56.27 |
| 11* | 1.341 | 0.300 | | |
| 12 | Infinity | 0.3 | 1.5168 | 64.20 |
| 13 | Infinity | 0.516 | | |
| Image Plane | Infinity | | | |

Aspherical Surface Data

| | 2nd Surface | 3rd Surface | 4th Surface | 5th Surface | 6th Surface |
|---|---|---|---|---|---|
| k | −1.917E+00 | 8.985E+01 | 0.000E+00 | 1.271E+00 | 7.682E+01 |
| A4 | 2.696E−02 | 7.364E−02 | 1.870E−02 | −6.518E−02 | −1.238E−01 |
| A6 | 2.790E−02 | −2.672E−01 | −5.450E−02 | 2.086E−01 | −1.338E−02 |
| A8 | −4.667E−02 | 2.408E−01 | −1.626E−01 | −3.682E−01 | 1.788E−01 |
| A10 | −4.163E−02 | −8.438E−02 | 2.888E−01 | 3.351E−01 | −7.091E−02 |
| A12 | 6.953E−02 | 2.854E−02 | −8.292E−02 | −9.850E−02 | −3.139E−02 |
| A14 | 0.000E+00 | 0.000E+00 | 0.000E+00 | 0.000E+00 | 3.007E−02 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | −5.419E+00 | −6.814E+00 | 0.000E+00 | −2.845E+00 |
| A4 | −5.451E−02 | 8.161E−02 | −5.883E−02 | −2.531E−01 | −1.395E−01 |
| A6 | −6.699E−02 | −2.447E−02 | 1.519E−01 | 6.637E−02 | 6.530E−02 |
| A8 | 1.128E−01 | −7.460E−02 | −1.655E−01 | −4.082E−03 | −2.218E−02 |
| A10 | −3.368E−02 | 7.670E−02 | 8.726E−02 | 1.532E−04 | 4.781E−03 |
| A12 | 2.421E−03 | −2.239E−02 | −1.865E−02 | −5.775E−05 | −5.903E−04 |
| A14 | 1.885E−03 | −9.529E−04 | 7.439E−04 | −1.313E−05 | 3.336E−05 |
| A16 | 0.000E+00 | 0.000E+00 | 0.000E+00 | 0.000E+00 | −3.589E−07 |

The image pickup lens according to Embodiment 5 satisfies all conditional expressions (1) through (10), as shown in Table 7.

Figure 10:
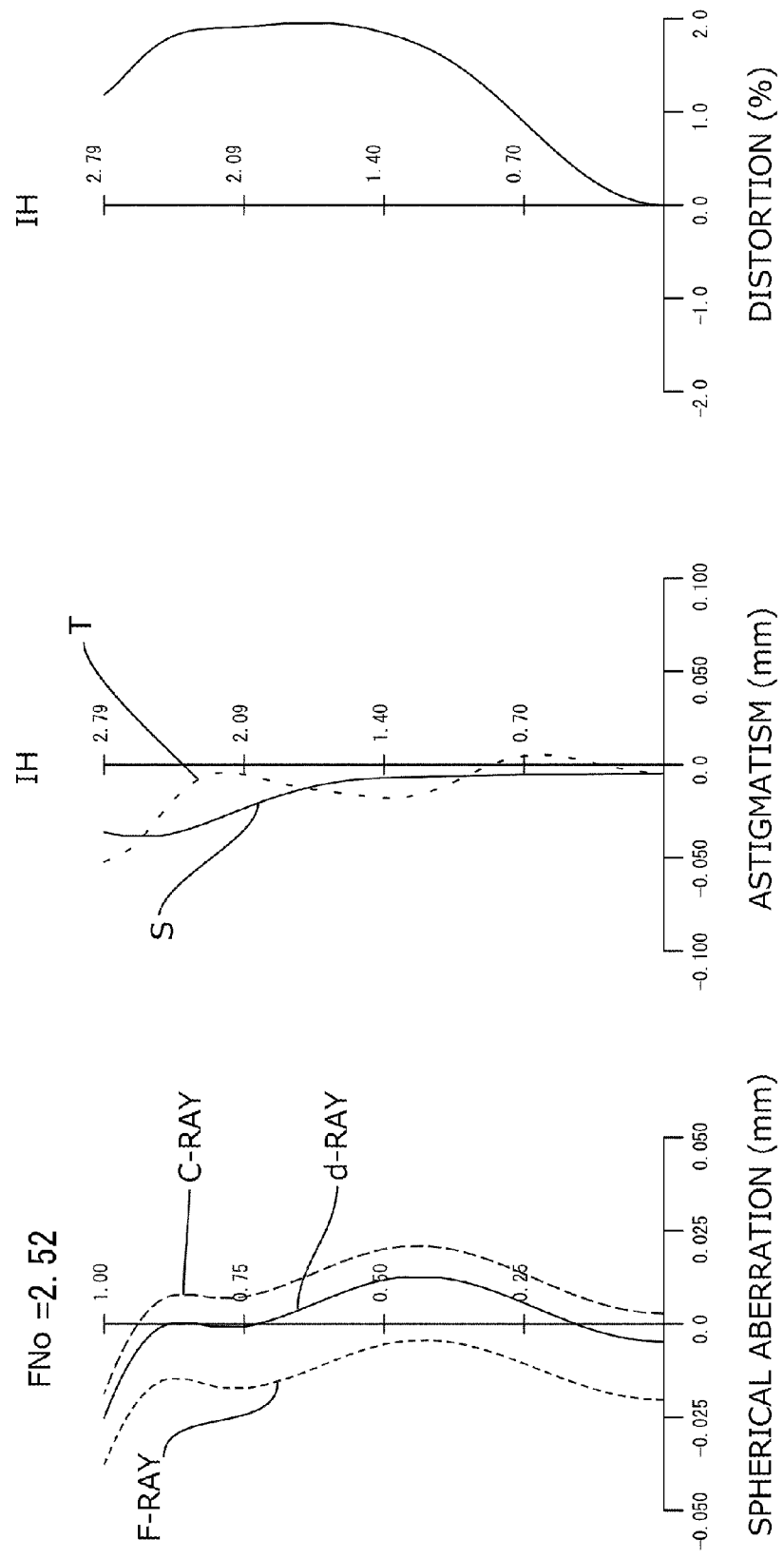
FIG. 10 is a view showing a spherical aberration, an astigmatism and a distortion of the image pickup lens according to Embodiment 5.
Figure 11:
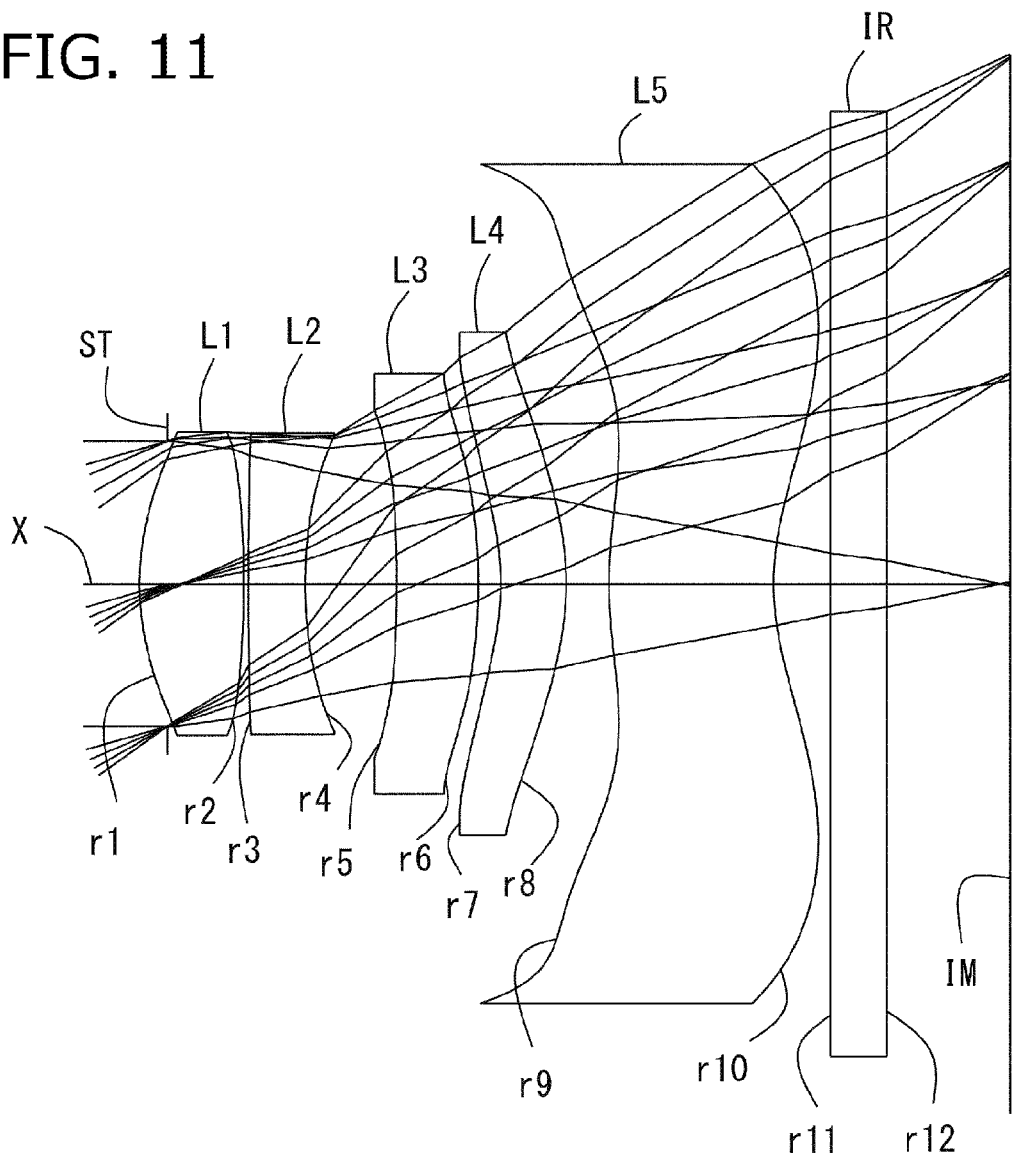
FIG. 11 is a view showing a general configuration of an image pickup lens according to Embodiment 6.

FIG. 10 shows a spherical aberration (mm), an astigmatism (mm), and a distortion (%) of the image pickup lens according to Embodiment 5. As shown in FIG. 10, it can be seen that the respective aberrations are satisfactorily corrected.

Further, the total track length TTL is as short as 4.69 mm and the ratio thereof to the maximum image height IH (TTL/2 IH) is 0.84, so that downsizing is realized even in a five-lens configuration. Moreover, the F-value is as bright as 2.52, and the half angle of field is approximately 35.8°, so that a relatively wide angle of field is achieved.

Embodiment 6

Basic lens data are shown in Table 6 below.

TABLE 6

Embodiment 6
Unit mm $f = 3.822$
$Fno = 2.53$
$\omega(°) = 35.71$
$IH = 2.791$

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.145 | | |
| 2* | 1.533 | 0.550 | 1.5251 | 56.27 |
| 3* | −5.177 | 0.025 | | |
| 4* | 48.409 | 0.300 | 1.6142 | 25.58 |
| 5* | 2.251 | 0.484 | | |
| 6* | −10.434 | 0.431 | 1.5251 | 56.27 |
| 7* | −3.504 | 0.120 | | |
| 8* | −1.397 | 0.347 | 1.5251 | 56.27 |
| 9* | −1.558 | 0.227 | | |
| 10* | 2.373 | 0.871 | 1.5251 | 56.27 |
| 11* | 1.406 | 0.300 | | |
| 12 | Infinity | 0.3 | 1.5168 | 64.20 |
| 13 | Infinity | 0.652 | | |
| Image Plane | Infinity | | | |

Aspherical Surface Data

| | 2nd Surface | 3rd Surface | 4th Surface | 5th Surface | 6th Surface |
|---|---|---|---|---|---|
| k | −1.684E+00 | 1.396E+01 | 0.000E+00 | 1.954E+00 | 3.631E+01 |
| A4 | 3.047E−02 | 8.522E−02 | 3.763E−02 | −5.319E−02 | −1.312E−01 |
| A6 | 1.551E−02 | −2.567E−01 | −2.761E−02 | 2.112E−01 | −3.502E−02 |
| A8 | −4.998E−02 | 2.217E−01 | −1.429E−01 | −3.525E−01 | 1.689E−01 |
| A10 | −6.136E−02 | −1.726E−01 | 2.928E−01 | 3.538E−01 | −7.447E−02 |
| A12 | −6.908E−02 | −5.786E−02 | −1.442E−01 | −9.963E−02 | −3.928E−02 |
| A14 | 0.000E+00 | 0.000E+00 | 0.000E+00 | 0.000E+00 | 1.025E−02 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | −7.396E+00 | −8.090E+00 | 0.000E+00 | −2.923E+00 |
| A4 | −4.673E−02 | 8.896E−02 | −6.682E−02 | −2.552E−01 | −1.425E−01 |
| A6 | −5.638E−02 | −2.485E−02 | 1.501E−01 | 6.431E−02 | 6.444E−02 |
| A8 | 1.171E−01 | −7.404E−02 | −1.643E−01 | −4.729E−03 | −2.211E−02 |
| A10 | −3.440E−02 | 7.842E−02 | 8.830E−02 | 3.142E−05 | 4.792E−03 |
| A12 | 4.136E−04 | −2.094E−02 | −1.837E−02 | −6.341E−05 | −5.929E−04 |
| A14 | 5.085E−04 | −1.782E−04 | 4.846E−04 | −1.386E−06 | 3.279E−05 |
| A16 | 0.000E+00 | 0.000E+00 | 0.000E+00 | 0.000E+00 | −2.846E−07 |

The image pickup lens according to Embodiment 6 satisfies all conditional expressions (1) through (10), as shown in Table 7.

Figure 12:
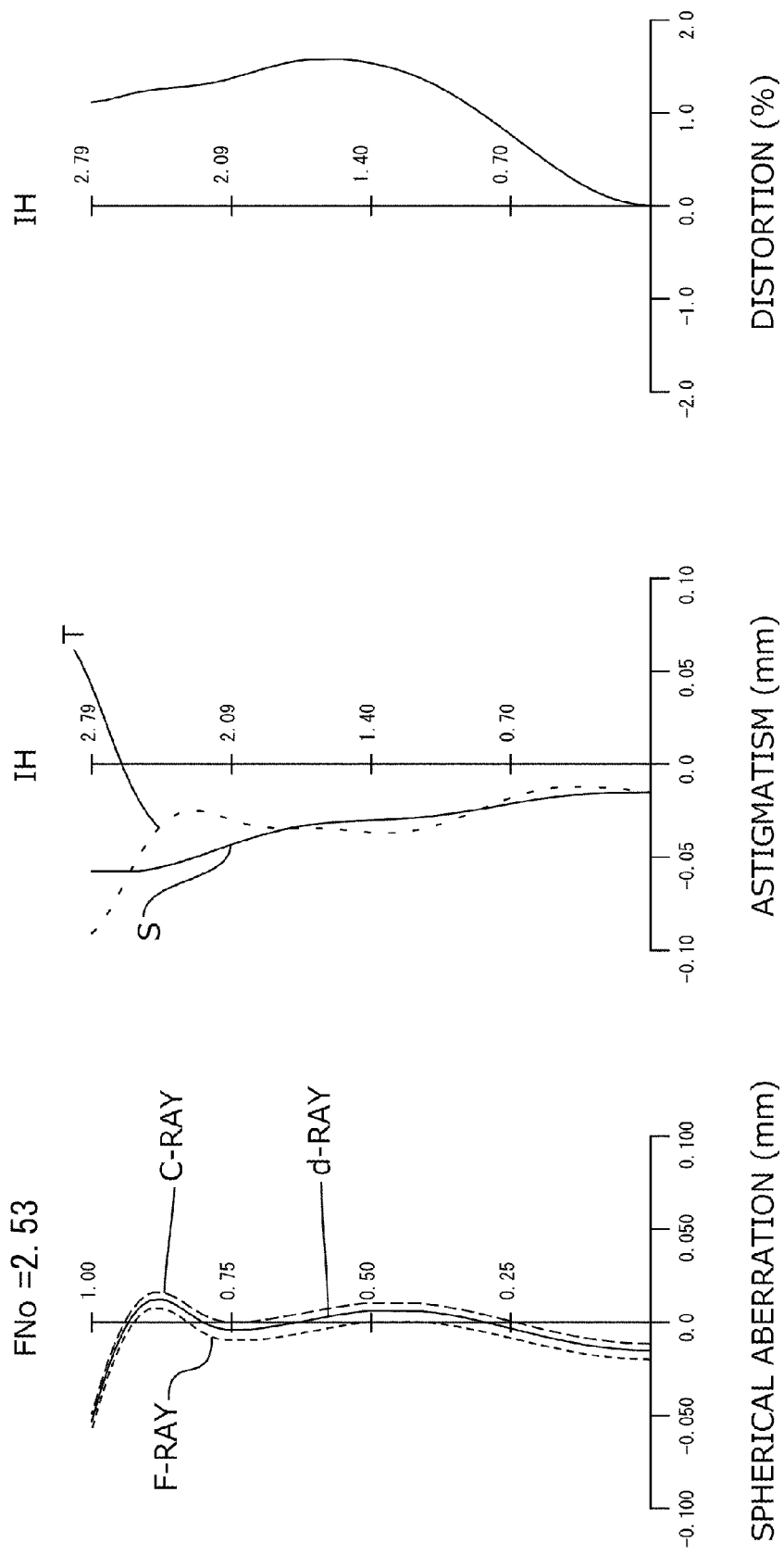
FIG. 12 is a view showing a spherical aberration, an astigmatism and a distortion of the image pickup lens according to Embodiment 6.

FIG. 12 shows a spherical aberration (mm), an astigmatism (mm), and a distortion (%) of the image pickup lens according to Embodiment 6. As shown in FIG. 12, it can be seen that the respective aberrations are satisfactorily corrected.

Further, the total track length TTL is as short as 4.49 mm and the ratio thereof to the maximum image height IH (TTL/2 IH) is 0.80, so that downsizing is realized even in a five-lens configuration. Moreover, the F-value is as bright as 2.53, and the half angle of field is approximately 35.7°, so that a relatively wide angle of field is achieved.

According to the image pickup lens of the embodiments of the present invention, the total track length TTL is 5 mm or smaller and the ratio of the total track length TTL to the maximum image height IH (TTL/2 IH) is 0.85 or smaller, so that superior downsizing is achieved even in a five-lens configuration. Further, various aberrations are corrected satisfactorily, the F-value is as bright as approximately 2.5, and the angle of field is approximately 72°, so that an image having a relatively wide angle of field can be taken.

Table 7 shows the values of the respective conditional expressions (1) through (10) according to Embodiments 1 through 6.

The effects of the present invention are as follows.

The present invention enables to provide an image pickup lens capable of realizing downsizing and thinning, which has a high resolution, a small F-value and a relatively wide angle of field.

What is claimed is:

1. An image pickup lens composed of five lenses for a solid-state imaging element, comprising, in order from an object side to an image side,
    an aperture stop,
    a first lens having a positive refractive power with a convex surface facing the object side,
    a second lens as a meniscus lens with a concave surface facing the image side,
    a third lens as a meniscus lens with a convex surface facing the image side,
    a fourth lens as a meniscus lens having a negative refractive power with a concave surface facing the object side near an optical axis, and
    a fifth lens as a meniscus lens with a concave surface facing the image side near the optical axis, wherein,
    the fourth lens having a convex surface facing the image side near the optical axis, the object-side surface of the fourth lens has an aspherical shape in which the negative refractive power weakens continuously toward a periphery after reaching a maximum value of the negative refractive power of the fourth lens, and

TABLE 7

|  | Embodiment 1 | Embodiment 2 | Embodiment 3 | Embodiment 4 | Embodiment 5 | Embodiment 6 |
| --- | --- | --- | --- | --- | --- | --- |
| f1 | 2.532 | 2.315 | 2.265 | 2.643 | 2.950 | 2.309 |
| f2 | −4.282 | −3.852 | −3.041 | −4.543 | −5.896 | −3.817 |
| f12 | 4.726 | 4.340 | 5.580 | 4.792 | 4.655 | 4.375 |
| Conditional Expression (1) $0.55 < f1/f < 1.0$ | 0.66 | 0.61 | 0.58 | 0.69 | 0.77 | 0.60 |
| Conditional Expression (2) $50 < \nu1 < 70$ | 56.12 | 56.16 | 55.98 | 55.98 | 56.27 | 56.27 |
| Conditional Expression (3) $\nu2 < 35$ | 23.91 | 25.58 | 30.13 | 23.91 | 23.42 | 25.58 |
| Conditional Expression (4) $50 < \nu3 < 70$ | 56.12 | 56.16 | 55.98 | 55.98 | 56.27 | 56.27 |
| Conditional Expression (5) $50 < \nu4 < 70$ | 56.12 | 56.16 | 55.98 | 55.98 | 56.27 | 56.27 |
| Conditional Expression (6) $50 < \nu5 < 70$ | 56.12 | 56.16 | 55.98 | 55.98 | 56.27 | 56.27 |
| Conditional Expression (7) $-1.6 < f2/f < -0.7$ | −1.12 | −1.01 | −0.78 | −1.19 | −1.55 | −1.00 |
| Conditional Expression (8) $1.05 < f12/f < 1.60$ | 1.24 | 1.14 | 1.43 | 1.25 | 1.22 | 1.14 |
| Conditional Expression (9) $1.7 < \nu1/\nu2 < 2.7$ | 2.35 | 2.20 | 1.86 | 2.34 | 2.40 | 2.20 |
| Conditional Expression (10) $-0.80 < f1/f2 < -0.45$ | −0.59 | −0.60 | −0.74 | −0.58 | −0.50 | −0.60 |

INDUSTRIAL APPLICABILITY

The image pickup lens having a five-lens configuration according to the respective embodiments of the present invention can be applied preferably to image pickup optical systems mounted on portable terminals such as cellular phones and smartphones, PDAs (Personal Digital Assistants) and so on where thinning is advanced and the number of pixels is increased in recent years. According to the image pickup lens of the present invention, the performance can be improved while realizing downsizing and wider angle of field in the image pickup optical system.

the image-side surface thereof has an aspherical shape in which a positive refractive power weakens toward the periphery, and wherein the following conditional expressions (1), (7), and (8) are satisfied:

$$0.55 < f1/f < 1.0 \tag{1}$$

$$-1.6 < f2/f < -0.7 \tag{7}$$

$$1.05 < f12/f < 1.60 \tag{8}$$

where f represents a focal length of an overall optical system of the image pickup lens, f1 represents a focal length of the first lens, f2 represents a focal length of the second lens, and f12 represents a composite focal length of the first and second lenses.

2. The image pickup lens according to claim 1, satisfying the following conditional expressions (2) through (6):

$$50<v1<70 \tag{2}$$

$$v2<35 \tag{3}$$

$$50<v3<70 \tag{4}$$

$$50<v4<70 \tag{5}$$

$$50<v5<70 \tag{6}$$

where v1 represents an Abbe number of the first lens, v2 represents an Abbe number of the second lens, v3 represents an Abbe number of the third lens, v4 represents an Abbe number of the fourth lens, and v5 represents an Abbe number of the fifth lens.

3. The image pickup lens according to claim 2, satisfying the following conditional expression (9):

$$1.7<v1/v2<2.7 \tag{9}$$

where v1 represents an Abbe number of the first lens, and v2 represents an Abbe number of the second lens.

4. The image pickup lens according to claim 1, satisfying the following conditional expression (10):

$$-0.80<f1/f2<-0.45 \tag{10}$$

where f1 represents a focal length of the first lens, and f2 represents a focal length of the second lens.

5. The image pickup lens according to claim 2, satisfying the following conditional expression (10):

$$-0.80<f1/f2<-0.45 \tag{10}$$

where f1 represents a focal length of the first lens, and f2 represents a focal length of the second lens.

6. An image pickup lens composed of five lenses for a solid-state imaging element, comprising, in order from an object side to an image side,
an aperture stop,
a front group with a positive refractive power as a whole, and
a rear group with a negative refractive power as a whole;
the front group including:
a first lens having a positive refractive power,
a second lens as a meniscus lens having a negative refractive power with a concave surface facing the image side near the optical axis, and
a third lens as a meniscus lens having a positive refractive power with a convex surface facing the image side near the optical axis;
the rear group including:
a fourth lens as a meniscus lens having a negative reflective power and having both surfaces formed as aspherical surfaces with a convex surface facing the image side near the optical axis, and
a fifth lens as a meniscus lens having both surfaces formed as aspherical surfaces with a concave surface facing the image side near the optical axis; wherein
the fourth lens having a concave surface facing the object side near the optical axis, the object-side surface of the fourth lens has an aspherical shape in which the negative refractive power weakens continuously toward a periphery after reaching a maximum value of the negative refractive power of the fourth lens, and
the image-side surface thereof has an aspherical shape in which a positive refractive power weakens toward the periphery; and wherein
the following conditional expressions (7) and (8) are satisfied:

$$-1.6<f2/f<-1.0 \tag{7}$$

$$1.05<f12/f<1.60 \tag{8}$$

where f represents a focal length of an overall optical system of the image pickup lens, f2 represents a focal length of the second lens, and f12 represents a composite focal length of the first and second lenses.

7. The image pickup lens according to claim 6, satisfying the following conditional expressions (2) through (6):

$$50<v1<70 \tag{2}$$

$$v2<35 \tag{3}$$

$$50<v3<70 \tag{4}$$

$$50<v4<70 \tag{5}$$

$$50<v5<70 \tag{6}$$

where v1 represents an Abbe number of the first lens, v2 represents an Abbe number of the second lens, v3 represents an Abbe number of the third lens, v4 represents an Abbe number of the fourth lens, and v5 represents an Abbe number of the fifth lens.

8. The image pickup lens according to claim 6, satisfying the following conditional expression (1):

$$0.55<f1/f<1.0 \tag{1}$$

where f represents a focal length of an overall optical system of the image pickup lens, and f1 represents a focal length of the first lens.

9. The image pickup lens according to claim 7, satisfying the following conditional expression (9):

$$1.7<v1/v2<2.7 \tag{9}$$

where v1 represents an Abbe number of the first lens, and v2 represents an Abbe number of the second lens.

10. The image pickup lens according to claim 6, satisfying the following conditional expression (10):

$$-0.80<f1/f2<-0.45 \tag{10}$$

where f1 represents a focal length of the first lens, and f2 represents a focal length of the second lens.

11. The image pickup lens according to claim 7, satisfying the following conditional expression (10):

$$-0.80<f1/f2<-0.45 \tag{10}$$

where f1 represents a focal length of the first lens, and f2 represents a focal length of the second lens.

* * * * *

UNITED STATES PATENT AND TRADEMARK OFFICE
CERTIFICATE OF CORRECTION

| | | |
|---|---|---|
| PATENT NO. | : 9,494,773 B2 | Page 1 of 1 |
| APPLICATION NO. | : 14/482321 | |
| DATED | : November 15, 2016 | |
| INVENTOR(S) | : Tomohiro Yonezawa | |

It is certified that error appears in the above-identified patent and that said Letters Patent is hereby corrected as shown below:

In the Claims

Column 22, Claim 1, Line 28, cancel the text beginning with "-1.6<f2/f<-0.7" and insert -- -1.6<f2/f≤-1.0 --.

Column 24, Claim 6, Line 35, cancel the text beginning with "-1.6<f2/f<-1.0" and insert -- -1.6<f2/f≤-1.0 --.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*